Figure 1:
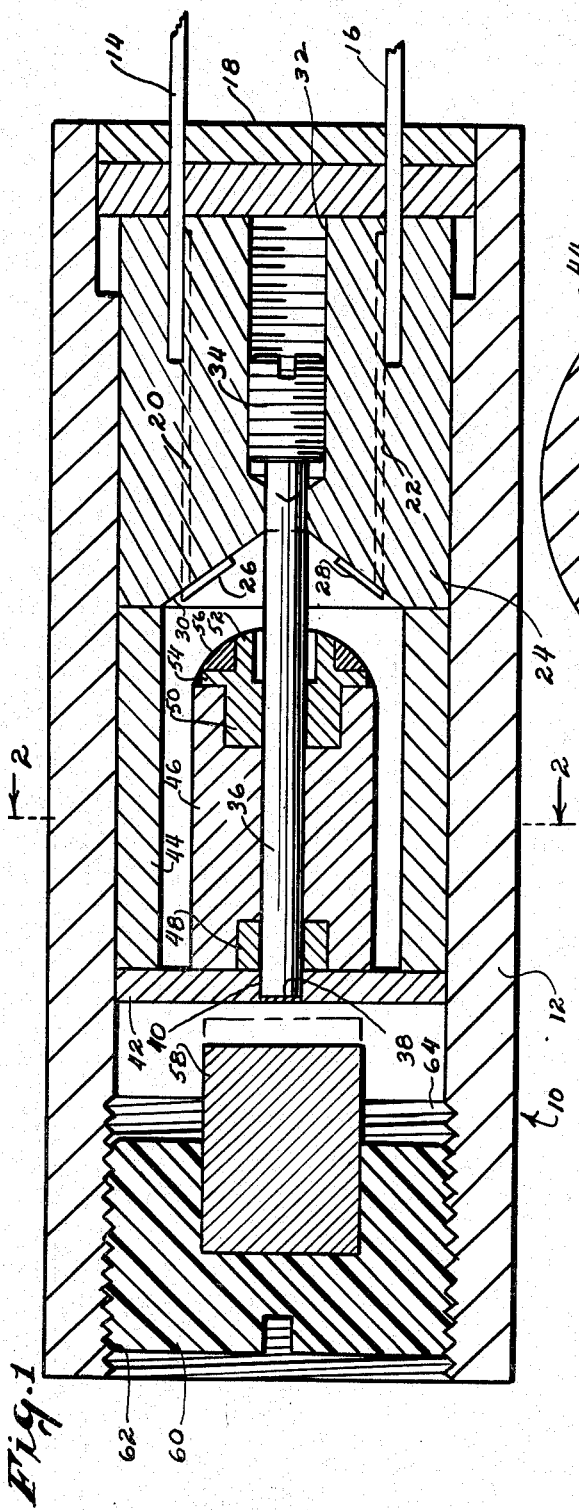

May 5, 1964    F. C. URI ETAL    3,132,220
ACCELERATION SWITCH
Filed Nov. 10, 1961

INVENTOR.
FRANK C. URI
AND
BY GEORGE J. PREISZ

ATTORNEYS

United States Patent Office 3,132,220
Patented May 5, 1964

3,132,220
ACCELERATION SWITCH
Frank C. Uri, 1 Oakridge Place, Eastchester, N.Y., and George J. Preisz, Bethpage, N.Y.; said Preisz assignor to Cleudeuin Preisz, Bethpage, N.Y.
Filed Nov. 10, 1961, Ser. No. 151,579
4 Claims. (Cl. 200—61.45)

This invention relates to an electric switch and, more particularly, relates to an inertial actuated switch which will close an electric circuit when subject to an acceleration force of user-selected amplitude.

Inertia switches in the form of an accelerometer (i.e. a spring restrained inertial mass) are known to the art. Such switches, however, can be constructed so as to remain in the actuated position after cessation of the acceleration force only with relatively complex mechanical latch arrangements.

More recently, acceleration sensitive switches have been constructed using a ball of magnetic material which is generally mounted within a conical seat. A magnetic field is established tending to hold the ball in the seat. Acceleration forces operating transversely to the axis of the conical seat will deflect the ball from the seat when the acceleration amplitude is sufficiently high to overcome the force established by the magnetic field and cause the ball to contact switch elements to close an electric circuit. The ball is held in this closed switch position by providing that the magnetic lines of force close through the ball in this position. However, such switches are subject to contact bounce and chattering which adversely influences performance. Further, it is difficult to accurately predetermined the acceleration amplitude for switch closure with repeating accuracy in such switches.

It is, therefore, a primary object of this invention to provide an acceleration responsive switch in which the switch is responsive solely to acceleration along one axis.

It is a further object of this invention to provide an acceleration sensitive switch in which the acceleration magnitude for switch closure can be accurately and adjustably set by the user.

In accordance with these objects, there is provided, in a preferred embodiment of the present invention, an inertial mass slidably mounted on a shaft centrally positioned within an enclosing housing. The inertial mass is constructed of a magnetic material. The inertial mass is free to slide on the shaft between the first position defined by a controllable stop and a second position defined by switch contacts to be bridged by the mass.

A magnet, of a suitable permanent type is movably mounted in the housing. Initially, the inertial mass is positioned against the stop where it is held by the magnetic force. By adjustment of the position of the magnet with respect to the inertial mass, the force of the magnetic attraction can be varied. Thus the magnitude of the acceleration force required to cause the mass to break away from the magnet can be predetermined. Where the mass breaks away, the mass will slide on the shaft to contact the switch contacts. Since the magnetic attraction falls off rapidly with distance, the switch will remain in the actuated position until such time as the acceleration forces are reversed or decreased relative to distance and magnet.

Since the inertial mass is constrained to movement along the shaft, the swtich is responsive only to acceleration in the direction of the shaft axis and contact chatter due to transverse acceleration forces are eliminated.

Figure 2:
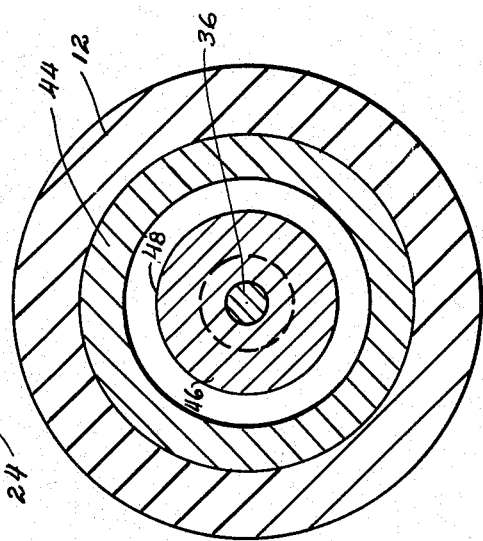

Having thus briefly described the invention, it will be described in more detail, along with other objects and advantages thereof, in the following detailed description which may best be understood by reference to the accompanying drawing of which:

FIG. 1 is a cross-sectional view of the switch constructed in accordance with the present invention; and
FIG. 2 is a cross-sectional view taken along lines 2—2 of FIG. 1.

In the figures, there is shown the acceleration switch 10 which is housed within the cylindrical casing 12. The switch is provided with electrical terminals 14 and 16 extending outwardly from the end cap 18 thereof. The terminals 14 and 16 pass through the end cap in the hermetically sealed engagement therewith. The terminals 14 and 16 extend into electrical contact with conductor strips 20 and 22, respectively, which pass through the insulator switch block 24 and are bent to form switch contacts 26 and 28, respectively. The insulator switch block is provided with a conically shaped portion 30 and contacts 26 and 28 are located thereon.

A central threaded aperture 32 is provided in the switch block to receive the threaded mounting stud 34 of shaft 36. The mounting stud allows selective adjustment of the axial position of the shaft to permit movement thereof until the end 38 of the shaft is housed within the cavity 40 of the transversely extending stop or seat 42. The stop may be made of a suitable non-magnetic material which is preferably an insulator. If the material is a conductor, the shaft 36 must be insulated therefrom. An annular spacer 44 is provided to regulate the spacing between the stop 42 and the mounting block 24. An inertial mass 46 is slidably mounted on shaft 36 and can move from a position determined at one end by the stop 42 and at the other end by the switch mounting block 24. The inertial mass is constructed of a magnetic material. To lower the friction, a brass bushing 48 is provided at one end and bushing 50 is provided at the other, each bushing bearing on the shaft 36. Bushing 50 is provided with an axially extending arm 52 and a radially extending arm 54 to define a sector in which is housed an annular switch contact 56 which is constructed of material having low contact resistance such as silver. It is preferable to mount the annular contact 56 within bushing 50 and to machine the entire assembly to its desired shape as a unit.

Thus, as the mass 46 moves to the right, the contact 56 will bridge switch contacts 26 and 28 providing electrical contact therebetween and thus closing the circuit connected to terminals 14 and 16.

To establish the magnitude of the acceleration force to which the switch will be sensitive, there is provided a magnet 58 housed within the mounting cup 60 which is provided with external threads 62 engaging the internal threads 64 on the housing 12. The magnet may be constructed of magnetic material having a high retentivity and high coercive force such as alnico, or any suitable material. By rotation of the mounting cup 60, the magnet is moved axially thereby changing the separation distance between the end of the magnet and the inertial mass 46. In this manner, the magnetic attractive force exerted by the magnet on the inertial mass can be varied. The magnetic attractive force holds the mass against stop 42 and the magnitude of the force determines the acceleration force required for the inertial mass 46 to break away from stop 42 and to move to contact switch elements 26 and 28. Thus, simple adjustment of the acceleration required for switch closure is provided.

Since the magnetomotive source varies inversely as the square of the separation distance between the magnet 58 and the inertial mass 46, as soon as the mass breaks away from the magnet, it will quickly move to close the contacts 26 and 28. The distance traveled by the mass determines the time or closure. Thus, the length of spaces 44 can be varied to suit the application intended. The mass will remain in the closed switch position until reset by an acceleration in the opposite direction or decreased acceleration proportioned to magnet 58 and mass 46 and distance to contacts 26 and 28. Due to the large contact area and the weight of the inertial mass, coupled with the fact that the contacts are resiliently backed by the insulator block 24, the switch closure will be accomplished without chattering. That is intermittent electrical closure due to a bounce of the inertial mass is avoided. The mass is insensitive to transverse vibration due to mounting on the shaft 36.

This invention may be variously modified and embodied within the scope of the subject board claims.

What is claimed is:

1. An inertial switch responsive to acceleration of predetermined magnitude comprising a switch block, a first and second switch contact mounted on one face of said block, a stop, said stop being spaced from said one face of said block, a longitudinal guide shaft centrally mounted between said stop and said one face of said block, and inertial mass slidably mounted on said shaft and movable from a position defined by said stop to a position defined by said block, a magnet, said magnet being movably mounted in longitudinal alignment with said shaft in said block to enable setting of the separation distance between said mass and said magnet.

2. An inertial switch in accordance with claim 1 in which said one face of said switch block is conically shaped, and in which said first and second switch contact is mounted on said conically shaped face.

3. An inertial switch in accordance with claim 1 in which said inertial mass comprises a magnetic material and which includes a first and second bushing in said mass.

4. An inertial switch in accordance with claim 1 in which said inertial mass comprises an annular contact ring of high conductivity metal positioned to contact said first and second contact.

References Cited in the file of this patent

UNITED STATES PATENTS

| | | |
|---|---|---|
| 2,747,041 | Thomson | May 22, 1956 |
| 2,898,415 | Clurman | Aug. 4, 1959 |
| 2,997,557 | Gillmor et al. | Aug. 22, 1961 |
| 2,997,883 | Wilkes | Aug. 29, 1961 |
| 3,018,664 | Humble | Jan. 30, 1962 |